United States Patent Office 3,832,284
Patented Aug. 27, 1974

3,832,284
METHOD FOR MANUFACTURE OF α-GALACTO-SIDASE BY MICROORGANISMS
Hideo Suzuki, Harumi Kobayashi, Yoshiko Ozawa, and Akira Kamibayashi, Chiba, Japan, assignors to Agency of Industrial Science & Technology, Tokyo, Japan
No Drawing. Filed Mar. 30, 1972, Ser. No. 239,741
Int. Cl. C12d 13/10; C13j 1/00
U.S. Cl. 195—11                                          6 Claims

ABSTRACT OF THE DISCLOSURE

Mycelia having strong α-galactosidase activity and very weak invertase activity are obtained by culturing a mold belonging to the genus Absidia in a culture medium incorporating therein at least one member selected from the group consisting of lactose, melibiose, raffinose and galactose. When beet molasses is treated with the said mycelia, raffinose contained in the molasses is decomposed into sucrose and galactose. Thus, the yield of sucrose can be increased.

This invention relates to a method for the manufacture of α-galactosidase by microorganisms.

In the beet sugar industry, α-galactosidase is widely known as an enzyme capable of decomposing raffinose which is contained in beet molasses or beet juice. Several species of microorganisms have been known to have their part in the production of the said enzyme. Examples are *Aerobacter aerogenes* and *E. coli*. When the enzyme produced by these microorganisms is allowed to act upon beet molasses or beet juice, however, the invertase which coexists with the α-galactosidase has such strong activity that it decomposes not only raffinose but also sucrose present in the beet molasses or juice. Such being the case, the enzyme has not yet been reduced to practical use.

The inventors took particular interest in and pursued a study of this problem. As a consequence, they succeeded in isolating from the soil a mold, *Mortierella vinacea* var. raffinose utilizer (ATCC 20034), which permits preparation of an enzyme preparation having strong α-galactosidase activity and very weak invertase activity. By the use of the enzyme preparation produced from the said microorganism, they successfully decomposed raffinose present in beet molasses or beet juice so as to increase the yield of sucrose (U.S. Pat. No. 3,647,625).

When the enzyme preparation produced from the aforementioned microorganism is used for decomposing raffinose, the decomposition ratio of raffinose by α-galactosidase has a close relation with the Brix degree of the beet molasses being used: The decomposition ratio is decreased in proportion as the Brix degree increases. When the beet molasses in use has a high Brix degree, the decomposition ratio must be heightened by increasing the amount of this enzyme added to the molasses. Generally, for all the processes of beet sugar production excepting the saccharate process, the beet molasses being treated for the decomposition of raffinose is desired to retain a high Brix degree in order to facilitate various treatments, such as concentration of sugar solution subsequent to decomposition and separation of pure sugar from the concentrated sugar solution. To maintain the decomposition ratio of raffinose at a fixed level, therefore, the operation requires a large amount of enzyme preparation. Thus, the cost involved in the production of enzyme becomes high, making the operation commercially infeasible. Besides this economic problem, the addition of a large amount of enzyme preparation is accompanied by a possibility that the mycelial component will leak into the decomposed sugar solution subsequent to completion of decomposition and impede the crystallization of sucrose.

It is true that the enzyme preparation produced from the said microorganism has very weak invertase activity. In spite of this, however, if the enzyme preparation is used in such a large amount as mentioned above, the amount of sucrose decomposed by the invertase contained in the enzyme preparation will rise till it is no longer at a negligible level.

It is the main object of this invention to provide a method for easily manufacturing from a microorganism an enzyme preparation having extremely high α-galactosidase activity and conspicuously weak invertase activity per unit weight of the enzyme preparation.

The other objects and characteristics of the present invention will become apparent from the following detailed description of the invention and working examples of invention cited hereinafter.

The inventors further contained a search for microorganisms having properties to produce higher α-galactosidase activity and yet avoid giving rise to invertase activity. Consequently, they have discovered a method for manufacturing an enzyme preparation characterized by strong α-galactosidase activity and very weak invertase activity, which method comprises culturing a mold of the genus Absidia in a specific culture medium under a fixed set of conditions.

The microorganisms which are usable for this purpose are molds belonging to the genus Absidia. They are type strains which have not been known to be capable of producing α-galactosidase richly and invertase meagerly. Their scientific names with citation of author's name are as follows:

(1) *Absidia lichtheimi* (Lucet et Costantin) Lendner (IFO 4009)
(2) *Absidia lichtheimi* (Lucet et Costantin) Lendner (IFO 4010)
(3) *Absidia reflexa* van Tieghem (IFO 5874)
(4) *Absidia hyalospora* (Saito) Lendner (IFO 8082)
(5) *Absidia ramosa* (Vuillemin) Lendner (IFO 8083)
(6) *Absidia regnierie* (Lucet et Costantin) Lendner (IFO 8084)

When a mold belonging to genus Absidia is cultured in a culture medium incorporating, as an inducer, at least one member selected from the group consisting of lactose, melibiose, raffinose and galactose in the presence of carbon source, nitrogen source and mineral source, there can effectively be prepared a desired enzyme preparation having strong α-galactosidase activity and very weak invertase activity chiefly within the mycellia of the microorganism.

Generally, glucose and similar substances are used as carbon sources. Since some of the substances used as the inducer may also be utilized as carbon source, it is not always necessary that the culture medium should incorporate a carbon source. For promoting the mycelial growth, however, it is desirable to incorporate glucose or some other suitable carbon source in the medium. The nitrogen sources which are usable for the culture medium include organic nitrogen sources such as corn steep liquor, malt, malt extract, malt culms, yeast extract, peptone, rice bran extract, fish cake and maize and inorganic nitrogen sources. For the promotion of mycelial growth, it is preferable to use an inorganic nitrogen source in combination with an organic nitrogen source. Particularly, corn steep liquor is easy to handle because of its fluidity. The mineral sources which prove effective for the present medium are those in common use, such as megnesium sulfate, potassium phosphate, and sodium chloride. In addition to those mentioned above, biotin or some other suitable growth accelerator may be added to the medium as occasion demands. Addition of such growth accelerator is not necessary where there is incorporated an organic nitrogen source. As concerns the culture conditions for allowing the microorganism to induce α-galactosidase effectively and enjoy accelerated growth, the pH value of the medium may generally range from 4 to 8, most preferably from 5 to 7. The culture temperature and period are somewhat dependent upon the kind of microorganism to be used and the composition of culture medium. Generally, in the case of culture under agitation, 40 to 60 hours of culture time is sufficient at a culture temperature of about 30° C. Considering that Mortierella vinacea var. raffinose utilizer requires about 72 hours of culture time, the present culture permits a marked reduction of culture time.

After the culture of the microorganism has been completed under the conditions mentioned above, the mycelia of the microorganism are recovered by filtration from the culture solution by a known method. In preparing the enzyme in the liquid form or in the powder form, the filtered mycelia are washed with water and then subjected to treatment by crushing method or autolysis method. The enzyme extracted consequently from the mycelia may then be processed as required.

The enzyme preparation thus obtained may be added in its unaltered state to beet molasses for decomposition of raffinose. Otherwise, the enzyme preparation may be packed in a column or placed in a container and the beet molasses passed continuously therethrough to have raffinose decomposed.

The properties of the enzyme preparation obtained from the mold of genus Absidia by the procedure mentioned above are compared in Table 1 with the properties of the enzyme preparation from a mold of genus Mortierella proposed formerly by the inventors.

TABLE 1

| | Mortierella vinacea var. raffinose utilizer | Absidia reflexa IFO 5874 |
| --- | --- | --- |
| α-Galactosidase activity/g. of dry mycelia (units) | 207×10⁴ | 446×10⁴ |
| Invertase activity/g. of dry mycelia (units) | 15,000 | 6,538 |
| Dry mycelium weight having 100×10⁴ units of α-galactosidase (mg.) | 483 | 224 |

WEIGHT OF MYCELIUM REQUIRED FOR DECOMPOSITION OF RAFFINOSE IN MOLASSES

| | Mortierella vinacea var. raffinose utilizer (g.) | Absidia reflexa (g.) |
| --- | --- | --- |
| Brix 20° (containing 3.86 g. of raffinose) | 5.6 | 2.6 |
| Brix 30° (containing 5.8 g. of raffinose) | 8.4 | 3.9 |
| Brix 40° (containing 7.74 g. of raffinose) | 11.2 | 5.2 |
| Brix 50° (containing 9.66 g. of raffinose) | 14.0 | 6.5 |
| Brix 60° (containing 11.6 g. of raffinose) | 16.8 | 7.8 |

As is clear from Table 1, about 1150×10⁴ units of α-galactosidase are required for effective treatment of a molassses of 20° Brix containing 3.86 g. of raffinose. The α-galactosidase activity derived from a mold of genus Mortierella vinacea var. raffinose utilizer by an ordinary procedure is 207×10⁴ units, suggesting that addition of 5.6 g. of mycelia (by dry basis) is required in the case of this treatment. The α-galactosidase activity obtained by the method of this invention is 446×10⁴ units and, therefore, the addition of 2.6 g. of mycelia suffices. The difference in the amount of mycelia to be added becomes conspicuous in proportion as the Brix degree increases. At 60° Brix, this difference amounts to 9 g.

This invention provides markedly improved α-galactosidase activity per unit weight of mycelia as mentioned above and, therefore, permits a proportional saving in the enzyme consumption. Thus, the method of this invention not merely proves highly economical but facilitates the subsequent treatment of the decomposition solution and enables a reduction in the volume of the decomposition vessel. The method by which the microorganism of the present invention is cultured for the induction of α-glucosidase is quite advantageous because the culture time is shorter than is needed for the conventional microorganisms.

Now, the invention is further described hereinafter with reference to preferred examples, which are cited solely for the purpose of illustration and should not be construed as limiting the invention in any way.

EXAMPLE 1

The saccharides listed in Table 2 were added, easy by 1%, to different portions of a basic culture medium incorporating 1% of glucose, 1% of corn steep liquor, 1% of $(NH_4)_2SO_4$, 0.3% of $KH_2PO_4$, 0.2% of $MgSO_4 \cdot 7H_2O$, 0.2% of NaCl and 0.3% of $CaCO_3$. Spores of species Absidia reflexa (IFO 5874) were inoculated to the resultant culture media and subjected to shaking culture at 30° C. for 72 hours on a shaker operated at a rate of 140 r.p.m. At the end of the culture, each of culture solutions was filtered to separate mycelia. The separated mycelia were washed thoroughly with water. Then, the mycelia were placed in a mortar, subjected to attrition together with sea sand until the mixture assumed pasty form, and suspended in distilled water having the same volume as the culture solution. The suspension, taken as enzyme solution, was tested for α-galactosidase activity. The values of α-galactosidase activity given in Table 2 are those determined in terms of enzyme activity of the mycelia obtained from 1 ml. of culture medium. The enzyme activity of the suspension of mycelia was determined by adding 1 ml. of mycelia suspension to a mixture of 0.5 ml. of 0.06M melibiose and 0.5 ml. of 0.1M phosphate buffer solution (pH 5.2) to permit reaction to ensue at 40° C. for two hours, thereafter heating the reaction mixture in a boiling water bath for five minutes to inactivate the enzyme, adding to the reaction solution 1 ml. of 1.8% $Ba(OH)_2 \cdot 8H_2O$ and 1 ml. of 2% $ZnSO_4 \cdot 7H_2O$ to deprive the solution of protein, centrifuging the solution, and assaying the supernatant portion for glucose content by the glucostat process. In consideration of the fact that the amount of glucose liberated from melibiose and the enzyme concentration are in a proportional relationship up to 1000 μg. of glucose, the suspension was diluted in advance so that it would fall in the measuring range satisfying this relationship. The amount of free glucose was multiplied by the number of dilutions. The α-galactosidase activity which liberates 1 μg. of glucose under the conditions mentioned above was taken as 1 unit.

TABLE 2

| Carbohydrate: | Units of α-galactosidase |
| --- | --- |
| Xylose | 0 |
| Arabinose | 0 |
| Rhamnose | 0 |
| Glucose | 0 |
| Mannose | 0 |
| Fructose | 0 |
| Galactose | 14,900 |
| Maltose | 0 |
| Cellobiose | 0 |
| Lactose | 53,800 |
| Melibiose | 14,340 |
| Sucrose | 0 |
| Raffinose | 37,240 |
| Soluble starch | 0 |
| Dextran | 0 |

The results shown in this table clearly indicate that galactose, melibiose, raffinose and lactose are most effective for the production of α-galactosidase and that lactose gives the best result.

Example 2

Spores of the strains listed in Table 3 were inoculated to different portions of a culture medium incorporating 1% of lactose, 1% of glucose, 1% of $(NH_4)_2SO_4$, 1% of corn steep liquor, 0.3% of $KH_2PO_4$, 0.2% of $MgSO_4 \cdot 7H_2O$, 0.2% of NaCl and 0.3% of $CaCO_3$ and cultured in the same manner as in Example 1. The resultant culture solutions were assayed for mycelial α-galactosidase activity and mycelial invertase activity. The invertase activity was determined by combining 1 ml. of mycelia suspension with 0.5 ml. of 0.06M sucrose and 0.5 ml. of 0.1M phosphate buffer solution (pH 5.0) to permit reaction to ensue under the same conditions as employed for the determination of α-galactosidase activity, centrifuging the solution to remove protein, and assaying the supernatant portion for invert sugar content by the Somogyi Nelson method. The invertase activity which produced 1 μg. of invert sugar under the conditions mentioned above was taken as 1 unit. The results are shown in Table 3. The invertase activity given in this table represents the enzyme activity of mycelia obtained from 1 ml. of culture medium.

The dry mycelial weight was found by drying at 105° C. that amount of mycelia which had been grown in 100 ml. of culture medium and thereafter weighing the dried mass of mycelia. The α-galactosidase activity per g. of dry mycelia is shown in Table 3 under the heading "α-galactosidase/g. of dry mycelia." Similarly, the invertase activity is shown therein under the heading "invertase/g. of dry mycelia."

From the table, it is clear that 42 hours of culture time was sufficient for the strain of *Absidia reflexa* IFO 5874. At the end of 42 hours of culture, the weight of dry mycelia obtained from 100 ml. of culture medium was 1.30 g.

Example 4

The strain of *Absidia hyalospora* IFO 8082 was cultured under the same conditions as in Example 3. The relationship between the length of culture time and the amount of α-galactosidase formed was determined. The results are shown in Table 5.

TABLE 5

| Culturing time (hrs.) | pH of culture solution | Units of α-galactosidase |
|---|---|---|
| 0 | 5.9 | 0 |
| 6 | 5.8 | 0 |
| 12 | 5.85 | 0 |
| 18 | 5.50 | 0 |
| 24 | 5.20 | 134 |
| 30 | 6.40 | 1,240 |
| 36 | 6.50 | 4,030 |
| 42 | 6.60 | 19,360 |
| 48 | 6.00 | 51,360 |
| 54 | 5.50 | 68,500 |
| 57 | 5.50 | 69,000 |

TABLE 3

| Strain | Dry weight of mycelium in 100 ml. (g.) | Units of α-galactosidase | α-Galactosidase/ g. of dry mycelium (units) | Units of invertase | Invertase/ g. of dry mycelium |
|---|---|---|---|---|---|
| *Absidia reflexa* (IFO 5874) | 1.3 | 58,000 | 446×10⁴ | 85 | 6,538 |
| *Absidia regnierie* (IFO 8084) | 1.3 | 52,000 | 440×10⁴ | 84 | 6,461 |
| *Absidia hyalospora* (IFO 8082) | 1.35 | 65,000 | 481×10⁴ | 87 | 6,444 |
| *Absidia lichtheimi* (IFO 4010) | 1.40 | 79,000 | 564×10⁴ | 92 | 6,571 |
| *Absidia lichtheimi* (IFO 4009) | 1.40 | 72,000 | 514×10⁴ | 90 | 6,428 |
| *Absidia ramosa* (IFO 8083) | 1.30 | 39,000 | 300×10⁴ | 84 | 6,462 |
| *Mortierella vinacea* var. raffinose utilizer (ATCC 20034) | 1.40 | 29,000 | 207×10⁴ | 210 | 15,000 |

For the purpose of comparison, spores of *Mortierella vinacea* var. raffinose utilizer were similarly cultured and the resultant culture solution was assayed. The results are also given in Table 3. It is clear from the table that the strains of genus Absidia gave much higher values of α-galactosidase activity and lower values of invertase activity. Further, the α-galactosidase activity possessed by 1 g. of dry mycelia was higher and the invertase activity was conversely lower for the strains of genus Absidia than for the strain of *Mortierella vinacea*.

Example 3

In 10 liters of water were dissolved 120 g. of lactose, 120 g. of glucose, 120 g. of $(NH_4)_2SO_4$, 120 g. of corn steep liquor, 36 g. of $KH_2PO_4$, 24 g. of $MgSO_4 \cdot 7H_2O$, 24 g. of NaCl and 36 g. of $CaCO_3$. The solution was placed in a jar fermentor and sterilized at 120° C. for 30 minutes, thereafter cooled to 30° C., and diluted with sterilized distilled water to a total volume of 12 liters. The strain of *Absidia reflexa* IFO 5874 was cultured in the solution under agitation of 300 r.p.m., with air introduced at a rate of 3 l./min. After lapse of indicated lengths of culture time, specimens were taken and assayed for α-galactosidase activity and pH value of culture solution. The results are shown in Table 4.

TABLE 4

| Culturing time (hrs.) | pH of culture solution | Units of α-galactosidase |
|---|---|---|
| 0 | 6.1 | 0 |
| 20 | 6.1 | 9,800 |
| 24 | 6.6 | 19,900 |
| 28 | 6.3 | 31,200 |
| 32 | 6.1 | 45,600 |
| 36 | 5.8 | 54,500 |
| 40 | 5.8 | 59,300 |
| 42 | 5.8 | 62,700 |
| 44 | 5.8 | 63,000 |

The table clearly shows that 54 hours of culture time was sufficient for this strain. At the end of 54 hours of culture, the weight of dry mycelia obtained from 100 ml. of culture medium was 1.35 g.

Example 5

Molasses produced by the Steffen process was diluted with water to 30° Brix and adjusted to pH 5.2 by the addition of sulfuric acid. In 200 g. of the resultant solution (containing 5.8 g. of raffinose), the mycelia of *Absidia reflexa* IFO 5874 (having a dry weight of 3.9 g. and 17,400,000 units of α-galactosidase) obtained in Example 2 were allowed to react at 50° C. for 2 hours 30 minutes while under shaking. At the end of the reaction, the mycelia were separated by filtration and washed with water. The filtrate and the washings were combined. A prescribed volume of this mixture was assayed by paper chromatography for residual raffinose content and increased sucrose content. To be more specific, the specimen was developed in a solvent consisting of 6 parts of n-butanol, 4 parts of pyridine and 3 parts of water. The raffinose zone and the sucrose zone consequently formed were cut off, washed out with water, and assayed by the cysteine-carbazole process. It was found that 78% of the original raffinose content had been decomposed and the sucrose content had been increased by 2.41 g.

Example 6

In 200 g. of molasses of 30° Brix prepared in the same manner as in Example 5, the mycelia of *Absidia reflexa* IFO 5874 (having 17,400,000 units of α-galactosidase activity) were allowed to react by the same method as in Example 5. After the reaction, the mycelia were washed with water and the washed mycelia were added to a new supply of diluted molasses and allowed to react. In this manner, the mycelia were used repeatedly in a total of five treatments. The decomposition solutions obtained in all the treatments were assayed for residual raffinose content and for increase in sucrose content. The results are shown in Table 6.

TABLE 6

| After run number | Increase in sucrose (mg.) | Decomposition of raffinose (percent) | Remaining α-galactosidase activity (percent) |
| --- | --- | --- | --- |
| 1 | 2.45 | 78.5 | 90 |
| 2 | 2.58 | 79.0 | 88 |
| 3 | 2.41 | 77.8 | 86 |
| 4 | 2.37 | 76.0 | 86 |
| 5 | 2.41 | 75.1 | 84 |

Example 7

Steffen molasses was diluted to 50° Brix and then adusted to pH 5.2 with sulfuric acid. In 200 g. of this solution (containing 9.66 g. of raffinose), the mycelia of *Absidia reflexa* IFO 5874 (having a dry weight of 6.5 g. and 28,980,000 units of α-galactosidase activity) obtained in Example 2 were allowed to react at 50° C. for 2 hours 30 minutes. At the end of the reaction, the decomposition solution was assayed for decomposition ratio of raffinose and for increase in sucrose content. The decomposition ratio of raffinose was found to be 56.2% and the increase in sucrose content to be 3.03 g. respectively.

Example 8

In 100 ml. of molasses (containing 3.87 g. of raffinose) diluted to 50° Brix and adjusted to pH 5.2, the mycelia of *Absidia reflexa* IFO 5874 (having a dry weight of 1.734 g. and 7,740,000 units of α-galactosidase activity) were allowed to react at 50° C. for ten hours. At the end of the decomposition, the mycelial component educed from the mycelia was assayed at wavelengths of 280 mµ and 260 mµ. To be specific, the decomposition solution was filtered and the filtrate was diluted with water to 1000 times the original volume and tested for optical density at 280 mµ and 260 mµ. Separately, the mycelia of *Mortierella vinacea* var. raffinose utilizer (having a dry weight of 3.730 g. and 7,740,000 units of α-galactosidase activity) were allowed to react in the same molasses under the same conditions as mentioned above. The decomposition solution was tested for optical density at wavelengths of 280 mµ and 260 mµ. As a control, the molasses in its unaltered form was tested for optical density. The results are shown in Table 7.

TABLE 7

| | Control | Mortierella vinacea var. raffinose utilizer | Absidia reflexa IFO 5874 |
| --- | --- | --- | --- |
| Optical density at 260 mµ | 0.414 | 0.515 | 0.430 |
| Optical density at 180 mµ | 0.302 | 0.348 | 0.310 |

The table indicates that when the two kinds of mycelia possessing an equal α-galactosidase activity were used for raffinose decomposition, the amount of mycelial component educed was smaller in the case of *Absidia reflexa* IFO 5874.

What is claimed is:

1. A method for the manufacture of α-galactosidase, which comprises culturing a mold belonging to the genus Absidia in a culture medium containing substances inductive of α-galactosidase under conditions permitting the formation of α-galactosidase, and recovering the α-galactosidase.

2. A method according to claim 1, wherein the mold is a member selected from the group consisting of *Absidia lichtheimi* (Lucet et Costantin) Lendner (IFO 4009), *Absidia lichtheimi* (Lucet et Costantin) Lendner (IFO 4010), *Absida reflexa* van Tieghem (IFO 5874), *Absidia hyalospora* (Saito) Lendner (IFO 8082), *Absidia ramosa* (Vuillemin) Lendner (IFO 8083) and *Absidia regnierie* (Lucet et Costantin) Lendner (IFO 8084).

3. A method according to claim 1, wherein the substance inductive of α-galactosidase is at least one member selected from the group consisting of lactose, melibiose, raffinose and galactose.

4. A method of reducing the raffinose content of sugar beet juice or beet molasses, which comprises adding to said juice or molasses mycelial matter of a mold belonging to the genus Absidia and cultured in a culture medium containing a substance inductive of α-galactosidase under conditions permitting the formation of α-galactosidase or the α-galactosidase prepared from said mycelial matter; and keeping the resultant mixture under conditions of enzymatic activity for said α-galactosidase until a portion of said raffinose has been decomposed.

5. The method of claim 4, wherein the mold is a member selected from the group consisting of *Absidia lichtheimi* (Lucet et Costantin) Lendner (IFO 4009), *Absidia lichtheimi* (Lucet et Costantin) Lendner (IFO 4010), *Absidia reflexa* van Tieghem (IFO 5874), *Absidia hyalospora* (Saito) Lendner (IFO 8082), *Absidia ramosa* (Vuillemin) Lendner (IFO 8083) and *Absidia regnierie* (Lucet et Costantin) Lendner (IFO 8084).

6. The method of claim 5, wherein the substance inductive of α-galactosidase is at least one member selected from the group consisting of lactose, melibiose, raffinose and galactose.

References Cited

UNITED STATES PATENTS 3,647,625   3/1972   Suzuki et al. _____ 195—11

OTHER REFERENCES

Chemical Abstracts, vol 58, 14475e (1963).
Chemical Abstracts, vol. 60, 13606b (1964).

LIONEL M. SHAPIRO, Primary Examiner

U.S. Cl. X.R.

195—65